US005896934A

United States Patent [19]

Yaniero et al.

[11] Patent Number: 5,896,934

[45] Date of Patent: Apr. 27, 1999

[54] RECIPROCATING TOOL HAVING A PISTON RETAINER

[75] Inventors: Robert A. Yaniero, Charlotte, N.C.; Jack Pressley, Hudson, Ohio

[73] Assignee: Chicago Pneumatic Tool Company, Rock Hill, S.C.

[21] Appl. No.: 08/925,886

[22] Filed: Sep. 8, 1997

[51] Int. Cl.[6] .......... B23B 45/16

[52] U.S. Cl. .......... 173/132; 173/128; 173/210; 279/19.4

[58] Field of Search .......... 173/210, 128, 173/132; 279/19, 19.6, 19.7, 76, 79, 80

[56] References Cited

U.S. PATENT DOCUMENTS

| | | | |
|---|---|---|---|
| 895,349 | 8/1908 | Donohoe | 173/132 |
| 1,035,358 | 8/1912 | Keller . | |
| 1,220,100 | 3/1917 | Haeseler . | |
| 2,046,135 | 6/1936 | Smith, Sr. . | |
| 2,223,727 | 12/1940 | Homen . | |
| 3,003,773 | 10/1961 | Fuehrer | 173/210 |
| 3,161,241 | 12/1964 | Allen et al. . | |
| 3,167,135 | 1/1965 | Wilmer . | |
| 3,179,185 | 4/1965 | O'Farrell . | |
| 3,847,229 | 11/1974 | Wanner et al. . | |
| 4,174,113 | 11/1979 | Eckman | 279/19.4 |
| 4,653,338 | 3/1987 | Yeomans . | |
| 5,095,998 | 3/1992 | Hesse et al. . | |
| 5,131,476 | 7/1992 | Harrington | 173/17 |
| 5,320,177 | 6/1994 | Shibata et al. . | |
| 5,350,025 | 9/1994 | Campbell et al. . | |
| 5,522,606 | 6/1996 | Pressley et al. | 279/91 |

*Primary Examiner*—Stephen F. Gerrity
*Assistant Examiner*—Steven Jensen
*Attorney, Agent, or Firm*—Schmeiser, Olsen & Watts

[57] ABSTRACT

Disclosed is a reciprocating pneumatic tool that includes a retainer mechanism for preventing the piston from freely exiting the barrel of the tool when the retaining sleeve and workpiece are removed. The retainer mechanism does not interfere with the functional operation of the tool when the workpiece and sleeve are attached to the tool. The retainer mechanism is mounted distally around the butt of the workpiece such that no contact occurs with the retainer mechanism or the piston.

17 Claims, 3 Drawing Sheets

RECIPROCATING TOOL HAVING A PISTON RETAINER

BACKGROUND OF THE INVENTION

1. Field of the Invention

The present invention relates to reciprocating power tools, and more particularly, to a improvement for retaining the piston in the barrel of a pneumatic tool.

2. Description of the Prior Art

Reciprocating power tools that hammer, chisel, and drill have been utilized in the construction industry for years, and will likely continue to play an important role on most job sites in the future. Pneumatically driven reciprocating tools have proven to be particularly effective in delivering high performance for relatively low cost. While ongoing design improvements have enhanced certain functional aspects of such tools, the basic design concept of a reciprocating pneumatic tool has not changed.

An example of such a tool is the Chicago Pneumatic™ 4181™ "Rivet Buster." Like most similar pneumatically driven tools, the 4181 includes an elongated barrel with a handle and trigger at one end and a retaining sleeve at the other end for holding a workpiece (e.g., a chisel or the like). Inside an upper portion of the barrel, proximate the handle, is a piston that reciprocates back and forth within the barrel, repeatedly striking the butt end of the workpiece within the lower portion of the barrel, thereby causing the workpiece head to reciprocate outside of the barrel.

As noted above, such tools include a retaining sleeve, which may be removed to perform routine maintenance on the tool or to remove or replace the workpiece. Unfortunately, in tool designs like the 4181, once the sleeve is removed, the piston can freely escape from the barrel. This typically is not seen as a problem given that easy removal of the piston may be desirable for maintenance purposes. Moreover, as long as the user takes basic precautionary steps, such as disengaging the tool from the air supply before removing the sleeve, the design presents no problem. However, if the worker fails to take such precautions, the piston could inadvertently exit the barrel. For example, if the sleeve is removed and the trigger is pressed while the tool is operable, the piston could be ejected from the barrel with a fair amount of force, causing damage to the piston.

Thus, a need exists to provide a mechanism that can be readily incorporated into existing tools that will prevent the free escape of the piston from the barrel when the retainer sleeve is removed. In addition, the mechanism should be easily replaceable, and be located where it does not interfere with the existing functionality of the tool.

SUMMARY OF THE INVENTION

In order to overcome the limitations of the prior art, the present invention provides a mechanism for preventing the free escape of the piston from the barrel of a reciprocating tool when the retaining sleeve is removed. The improved tool comprises a barrel, a piston slidably placed within an upper portion of the barrel, a retaining sleeve mounted proximate a lower portion of the barrel, a workpiece slidably retained within the lower portion of the barrel by the retaining sleeve, and a retainer mechanism for preventing the free escape of the piston from the barrel when the retaining sleeve is removed. The retainer mechanism should be mounted within the lower portion of the barrel in such a manner such that neither the piston nor the workpiece contact the retainer mechanism during the actual operation of the tool.

The retainer mechanism may comprise a retainer ring placeable within a circular groove cut out of the inside of the barrel. Specifically, the retainer ring should be distally mounted around the butt of the workpiece. The retainer ring includes an opening with a diameter greater than the diameter of the butt of the workpiece, but less than the diameter of the piston. Therefore, the tool can operate without interference from the ring, yet the ring prevents the piston from exiting the barrel in the event the piston is inadvertently caused to be ejected from the barrel when the retaining sleeve is removed. The ring may include a tapered inner surface to help trap the piston if required. The ring may be made of strong, yet flexible material, with a scarf cut so that it can be removed from the barrel and replaced if necessary.

It is therefore an object of the present invention to provide a mechanism that will prevent the free escape of the piston from the barrel of a reciprocal tool when the retaining sleeve is removed.

It is therefore a further object of the present invention to provide a retaining mechanism that will not interfere or contact the piston or workpiece during the operation of the tool.

It is therefore a further object of the present invention to provide a retaining mechanism that is removable.

It is therefore a further object of the present invention to provide a retaining mechanism made from a material such as plastic, rubber or polyurethane.

It is therefore a further advantage of the present invention to provide a retaining mechanism that can be easily retrofitted into existing tool designs.

It is therefore a further object of the present invention to provide a retainer ring with a tapered inner surface in order to cause the piston to jam in the retainer ring thereby trapping the piston in the barrel should the piston be forced outward when the retaining sleeve is removed.

DESCRIPTION OF THE PREFERRED EMBODIMENT

Figure 1:
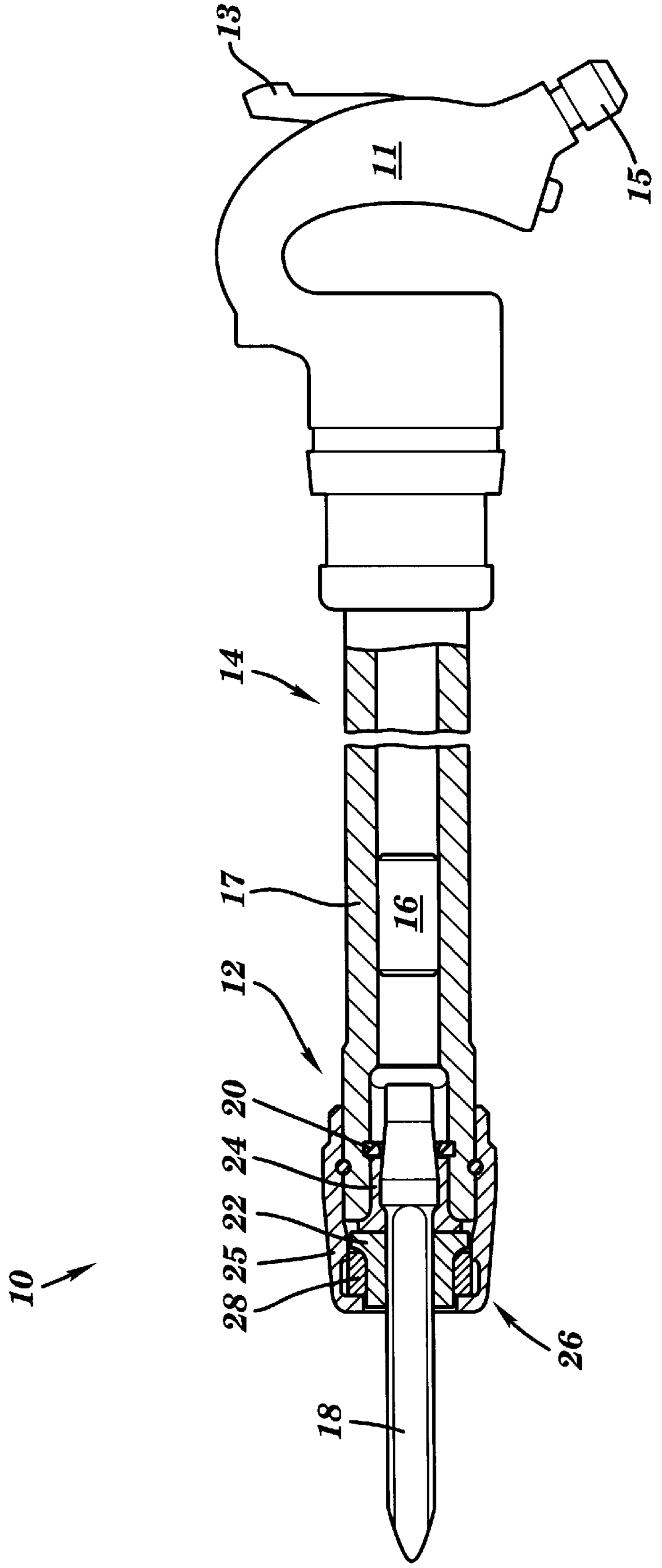
FIG. 1 depicts a cross-sectional side view of a pneumatic tool that includes a retainer ring in accordance with a preferred embodiment of the present invention.

FIG. 1 depicts a side view of a pneumatic tool 10 that includes a retainer ring in accordance with the present invention. The tool 10 generally comprises a handle 11, a barrel 17, a retaining sleeve 26, and a workpiece 18. The handle 11 includes an air intake port 15 and a trigger 13. To generally operate the tool, pneumatic air must be supplied into port 15. Pressing trigger 13 then causes workpiece 18 to reciprocate thereby causing a hammering, chiseling or drilling motion.

Barrel 17 includes an upper portion 14 and a lower portion 12. During operation, a piston 16 reciprocates within the upper portion 14 of the barrel and repeatedly strikes a first end of workpiece 18 causing the workpiece 18 to reciprocate within the lower portion of the barrel 12. The piston 16 is generally cylindrical in shape and has a maximum diameter that is approximately equal to the inner diameter of the upper portion 14 of the barrel 17. The tool includes a retaining sleeve 26 for slidably retaining the workpiece 18 in place such that a second end of the work piece (e.g., a chisel head) can extend and reciprocate outside of the tool 10. The second end of the workpiece 18 may include a chisel, drill, hammer, or any other commonly used tool.

As noted, retaining sleeve 26 provides a system for allowing workpiece 18 to slidably move within the lower portion of the barrel 12 during operation of the tool. In addition, retaining sleeve 26 can be removed from the tool 10 in order to remove and replace the workpiece 18 when the tool 10 is not in operation. Retaining sleeve 26 includes an outer sleeve 25, an upper inner sleeve 24, a lower inner sleeve 22 and a bumper 28. Upper inner sleeve 24 and lower inner sleeve 22 hold and lock onto the work piece 18 and are slidable within the retainer sleeve 26. The motion of workpiece 18 is limited by the longitudinal space within which the upper inner sleeve 24 and lower inner sleeve 22 can travel. In particular, the inner sleeves 22 and 24 are limited in a first direction by the end of lower portion 12 of the barrel and are limited in a second direction by the outer sleeve 25 and bumper 28 which also acts as a spring for returning the work piece to a neutral position.

The tool 10 further includes a retainer mechanism 20 that prevents piston 16 from escaping the lower portion of the barrel 12 when the retaining sleeve 26 and work piece 18 are removed from the tool 10. As is discussed with respect to FIGS. 2–4, the retainer mechanism does not interfere with the piston 16 or the workpiece 18 while the tool 10 is being operated. While this preferred embodiment generally describes the retainer mechanism as a ring, it is understood that any device that is similarly situated to provide the same functionality falls within the scope of this invention. For example, a star shaped ring, a semi-circular ring, a nub shaped protrusion, or similar device could likewise be used.

Figure 2:
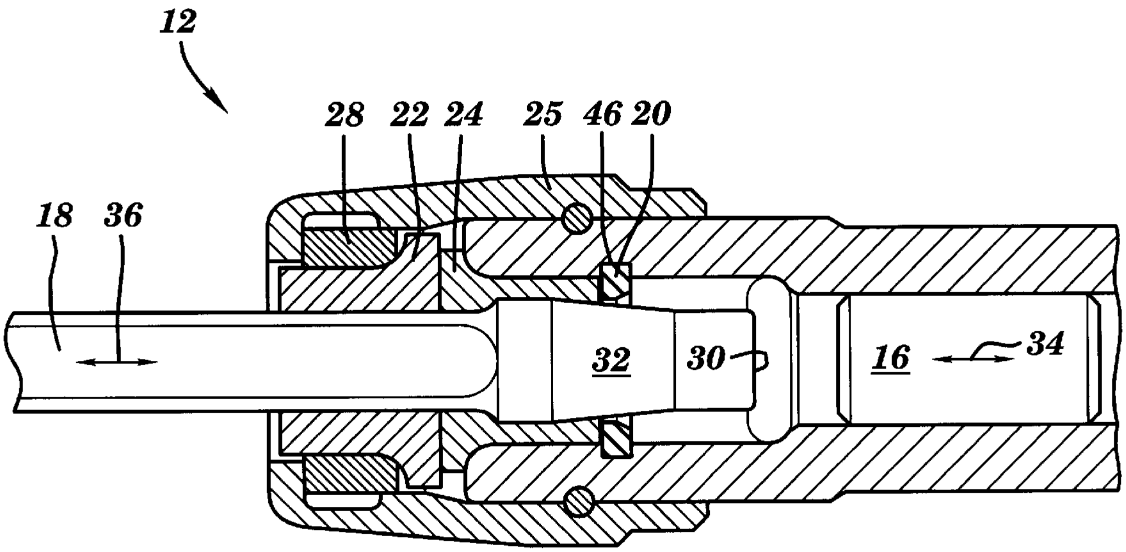
FIG. 2 depicts a cross-sectional side view of the lower barrel portion of a pneumatic tool with a work piece in a neutral position, the tool including a retainer ring in accordance with a preferred embodiment of the present invention.
Figure 3:
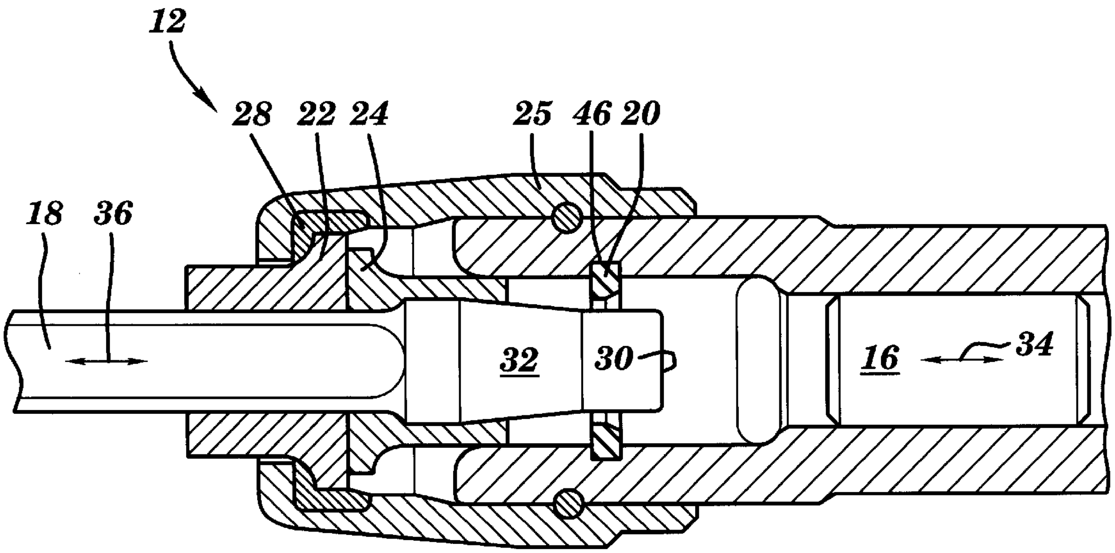
FIG. 3 depicts a cross-sectional side view of the lower barrel portion of a pneumatic tool with a work piece in an extended position, the tool including a retainer ring in accordance with a preferred embodiment of the present invention.

FIGS. 2 and 3 depict the placement of the retainer ring 20 during the tool's operation. Retainer ring 20 is placeable in a groove 46 cut out of the inside of the lower portion 12 of the barrel. It can be seen in both FIG. 2 and FIG. 3 that the retainer ring 20 is mounted in such a position that it is circumferentially outside (i.e., distally spaced from) the cross-sectional area of the butt portion 32 of workpiece 18. The butt 32, as used herein, defines that portion of the workpiece 18 that reciprocates within or through the retainer ring 20 during tool operation. FIG. 2 depicts the workpiece 18 in a retracted or "neutral" position such that the workpiece 18 is retracted into the lower portion 12 of the barrel as far as possible. As can be seen, upper inner sleeve 24 is flush with the end of the barrel thereby limiting the inward travel of the workpiece 18 to the point shown. Conversely, FIG. 3 depicts work piece position 18 in the extended or "impact" position such that the workpiece 18 is extended out of the barrel as far as possible. As can be seen, lower inner sleeve 22 is prevented from further outward motion by the outer sleeve 25 of retainer sleeve 26. Bumper 28 provides the spring means for returning the workpiece 18 to the retracted position shown in FIG. 2.

During operation, piston 16 reciprocates along longitudinal axis 34 and repeatedly strikes the end 30 of workpiece 18 to drive the workpiece from its retracted position as shown in FIG. 2 to its extended position as shown in FIG. 3. The result is a continuous reciprocating motion of the workpiece 18 back and forth along longitudinal axis 36. The motion of piston 16 is limited in the direction toward the workpiece 18 by the end 30 the workpiece 18 in its extended position as shown in FIG. 3. Thus, given this limitation, the piston 16 is never allowed to contact the retainer ring or intersect the cylindrical cross sectional space defined by the retainer ring 20 while the tool is operating.

As noted above, during the continuous reciprocating motion of the workpiece 18, the butt 32 of the work piece 18 always sits within the retainer ring 20. Thus, as opposed to the piston 16, the butt 32 of the workpiece 18 always resides or intersects within the cylindrical cross sectional space defined by the retainer ring 20. However, the workpiece butt 32, which reciprocates within the opening created by retainer ring 20, never contacts with the retainer ring because the retainer ring opening 42 (see FIG. 6) has a diameter that is greater than the maximum cross-sectional diameter of the butt 32 of the workpiece 18. Thus, the retainer ring 20 does not interfere with the functional operation of either the piston 16 or the workpiece 18 during the actual operation of the tool 10. In addition, the end 30 of the workpiece is likewise smaller in diameter than the ring opening 42 to allow the workpiece 18 to be freely installed into the lower portion of the barrel 12.

Figure 4:
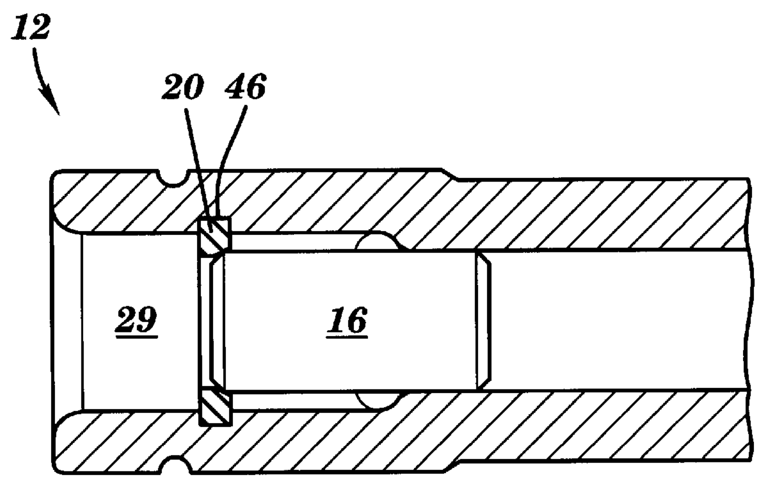
FIG. 4 depicts a cross-sectional side view of a lower barrel portion of a pneumatic tool with the retaining sleeve and workpiece removed, the view depicting the piston being blocked by the retaining ring in accordance with a preferred embodiment of the present invention.

The functional purpose of retainer ring 20 is depicted in FIG. 4. FIG. 4 depicts the barrel's lower portion 12 with the retaining sleeve 26 and workpiece 18 removed therefrom. As noted above, the retaining sleeve 26 may frequently be removed on a job site to perform maintenance or to remove or replace workpiece 18. If the tool 10 happened to still be connected to an air supply while the sleeve 26 was removed, pressing the trigger would cause the piston 16 to be forced outward without being limited in its outward travel by the end 30 of the workpiece 18. In this case, the pneumatic force on the piston 16 would cause the piston to be forced toward the opening 29 in the barrel. However, retainer ring 20, which has an opening with a diameter 42 that is less than the maximum diameter of the piston 16, will act to block the free escape of the piston 16 from the lower barrel portion 12.

It should be noted that upon impact of the piston 16 with the ring 20, the ring 20 will maintain its relative position in the barrel. In particular, the ring 20 will be jammed circumferentially outward into groove 46 thereby ensuring that the piston 16 is trapped in position. Thus, by providing a system wherein the ring is forced to expand into the groove 46, there is no chance for the ring 20 to be dislodged and pushed out ahead of the piston 16. The expansion of the ring 20 is facilitated by including a ring profile, such as a taper, that causes the ring to expand (see FIGS. 5 and 6).

Figure 5:
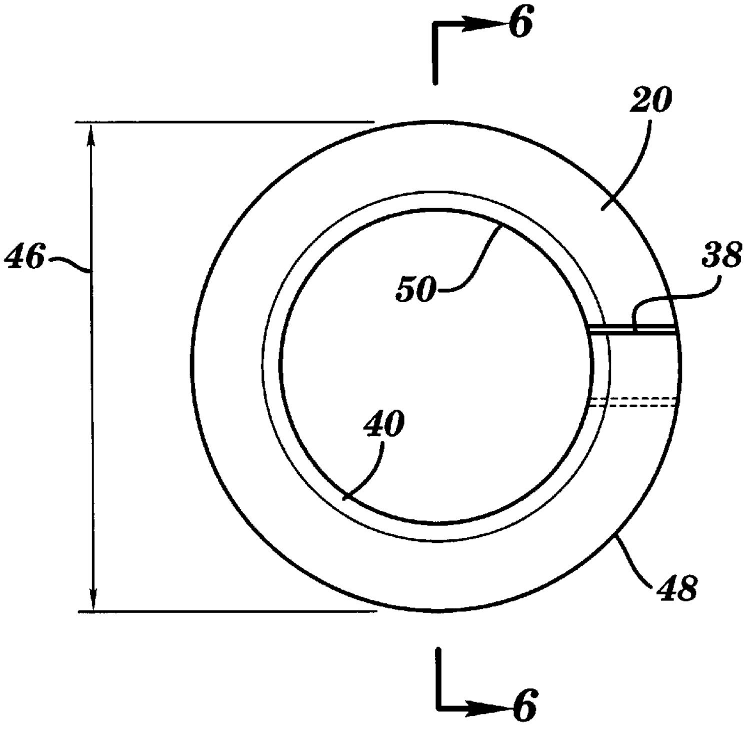
FIG. 5 depicts a front view of a retainer ring in accordance with a preferred embodiment of the present invention.
Figure 6:
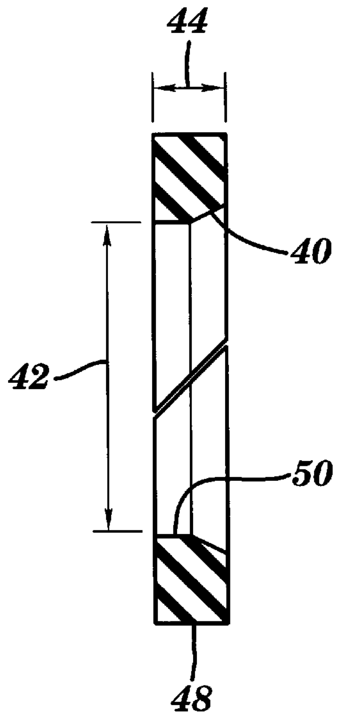
FIG. 6 depicts a cross-sectional side view of a retainer ring in accordance with a preferred embodiment of the present invention.

FIGS. 5 and 6 depict a front view and cross-sectional side view of the retainer ring 20, respectively. The retainer ring 20 includes an outer radial surface 48 and an inner radial surface 50. Retainer ring 20 has a minimum opening 42 that is greater in diameter than the butt 32 of the workpiece 18, but is smaller in diameter than the maximum diameter of the piston 16. The ring's dimensions include a width 44 and outer diameter 46, which together define the ring's cylindrical cross sectional area or space.

The opening of the ring 20 may include a tapered edge 40 to better handle the impact of the piston 16, should the piston 16 be caused to contact the ring 20. The tapered edge will cause a wedging effect which will cause ring 20 to be jammed into groove 46 and the piston 16 to become trapped in the barrel, rather than bounce back and forth within the barrel. It should be recognized that alternate ring profiles, rather than a taper, could likewise be utilized to provide a similar result. For example, a concave or rounded profile could possibly provide the same functionality.

Finally, the ring 20 may include a scarf cut 38 which allows the ring 20 to be easily removed or inserted into the barrel of the tool 10. Because of the likely damage caused during an impact of the piston with the ring 20, it is envisioned that the ring 20 should be easily replaceable. In addition, removal of the ring 20 should be relatively easy in the event that access to the piston, for maintenance purposes or the like, is required.

In order to accomplish the above, the ring 20 should be manufactured from a strong, flexible material such as synthetic rubber, plastic, fibre or polyurethane. The material should also be extremely rugged and hard to shear. An example of a synthetic rubber that would satisfy the basic requirements is Dupont's Hytrel 55D™. Recent advances in the ability to manufacture polyurethane to very specific and demanding specifications, however, may provide unexpectedly good characteristics in terms of strength and durability for this type of retaining device. Nonetheless, other ring materials and designs could provide adequate functionality and are therefore considered to fall within the scope of this invention. For example, a metal snap-ring or spring like device could be substituted for the ring as described herein.

The embodiments and examples set forth herein were presented in order to best explain the present invention and its practical application and to thereby enable those skilled in the art to make and use the invention. However, those skilled in the art will recognize that the foregoing descriptions and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. A pneumatic tool comprising:

a barrel;

a work piece slidably retained in a lower portion of the barrel wherein the workpiece includes a first end residing within the barrel and a second end extending beyond the barrel;

a piston slidably mounted within the barrel, the piston being reciprocally driven within the upper portion of the barrel to cause reciprocating contact with the first end of the workpiece; and a retainer ring mounted within the lower portion of the barrel wherein the retainer ring includes an opening having a diameter that is greater than the diameter of the first end of the workpiece but less than the diameter of the piston, and wherein the retainer ring has an inner surface that is tapered to cause a wedging effect and trap the piston in the barrel should the piston contact the retainer ring.

2. The pneumatic tool of claim 1 wherein the retainer ring is mounted within the lower portion of the barrel distally around a butt of the workpiece proximate the first end of the workpiece, and wherein the butt can reciprocate within and independently of the retainer ring.

3. The pneumatic tool of claim 1 wherein the piston has a range of reciprocating motion that does not intersect the cylindrical space defined by the retainer ring.

4. The pneumatic tool of claim 1 wherein the piston has a limited range of motion that prevents the piston from contacting the retainer ring, the limited range of motion being limited by the first end of the workpiece.

5. The pneumatic tool of claim 1 wherein the barrel includes a circular groove within the lower portion of the barrel for holding the retainer ring.

6. The pneumatic tool of claim 1 wherein the retainer ring is comprised of a synthetic rubber.

7. The pneumatic tool of claim 1 wherein the retainer ring is comprised of plastic.

8. The pneumatic tool of claim 1 wherein the retainer ring is comprised of fibre.

9. The pneumatic tool of claim 1 wherein the retainer ring is removably mounted within the barrel.

10. A reciprocating tool comprising:

a piston slidably mounted within an upper portion of a barrel;

a retaining sleeve for retaining and providing a limited range of reciprocal motion to a workpiece within a lower portion of the barrel, wherein the workpiece includes a first end having a predetermined diameter that is strikeable by the piston; and a retaining ring mounted within the lower portion of the barrel at a position through which a butt of the workpiece proximate the first end can reciprocate, wherein the retaining ring has an opening with a diameter greater than the predetermined diameter of the first end of the workpiece, and wherein the retaining ring includes a tapered inner surface to cause a wedging effect and trap the piston in the barrel should the piston contact the retainer ring.

11. The reciprocating tool of claim 10 wherein the retaining ring is made of synthetic rubber.

12. The reciprocating tool of claim 10 wherein the lower portion of the barrel includes a groove for holding the retaining ring.

13. The reciprocating tool of claim 10 wherein the piston has a diameter greater than the opening of the retainer ring.

14. The reciprocating tool of claim 10 wherein the piston has a range of reciprocating motion that does not intersect the cylindrical cross-sectional space defined by the retainer ring.

15. The reciprocating tool of claim 10 wherein the piston has a limited range of motion that prevents the piston from contacting the retainer ring, the limited range of motion being limited by the first end of the workpiece.

16. A pneumatic tool comprising:

a barrel;

a work piece slidably retained in a lower portion of the barrel wherein the workpiece includes a first end residing within the barrel and a second end extending beyond the barrel;

a piston slidably mounted within the barrel, the piston being reciprocally driven within the upper portion of the barrel to cause reciprocating contact with the first end of the workpiece; and a retainer ring mounted within the lower portion of the barrel wherein the retainer ring includes an opening having a diameter that is greater than the diameter of the first end of the workpiece but less than the diameter of the piston, and wherein the retainer ring includes a scarf cut for facilitating the removal and replacement of the retainer ring.

17. A reciprocating tool comprising:

a piston slidably mounted within an upper portion of a barrel;

a retaining sleeve for retaining and providing a limited range of reciprocal motion to a workpiece within a lower portion of the barrel, wherein the workpiece includes a first end having a predetermined diameter that is strikeable by the piston; and a retaining ring mounted within the lower portion of the barrel at a position through which a butt of the workpiece proximate the first end can reciprocate, wherein the retaining ring has an opening with a diameter greater than the predetermined diameter of the first end of the workpiece, and wherein the retaining ring includes a scarf cut for facilitating removal and replacement of the retaining ring.

* * * * *